United States Patent [19]
Hertel

[11] Patent Number: 5,561,870
[45] Date of Patent: Oct. 8, 1996

[54] SHOWER CURTAIN ROD ATTACHMENT

[76] Inventor: Donald L. Hertel, 2328 Bonnie Brae, Santa Ana, Calif. 92706

[21] Appl. No.: 509,673

[22] Filed: Jul. 31, 1995

Related U.S. Application Data

[63] Continuation-in-part of Ser. No. 183,517, Jan. 19, 1994, abandoned.

[51] Int. Cl.⁶ .............................. A47H 21/00; F16B 2/22
[52] U.S. Cl. ..................... 4/609; 4/558; 4/608; 403/205; 403/397; 16/87 R; 24/339
[58] Field of Search .................. 16/87 R; 4/609, 4/558, 608; 403/205, 397; 24/339

[56] References Cited

U.S. PATENT DOCUMENTS

| | | | |
|---|---|---|---|
| 2,923,013 | 2/1960 | Wasserman | 4/610 |
| 2,936,076 | 5/1960 | Harris | 248/340 |
| 3,297,817 | 1/1967 | Stier | 24/339 |
| 3,669,491 | 6/1972 | Weslock | 403/391 |
| 4,385,409 | 5/1983 | File | 4/608 |
| 4,769,862 | 9/1988 | Skrzelowski | 4/610 |
| 5,170,974 | 12/1992 | Ruggiero | 248/251 |
| 5,216,766 | 6/1993 | Lang | 4/609 |
| 5,345,992 | 9/1994 | Turner | 16/87.2 |
| 5,371,991 | 12/1994 | Bechtel et al. | 403/397 |

FOREIGN PATENT DOCUMENTS

| | | | |
|---|---|---|---|
| 1132329 | 3/1957 | France | 24/339 |

*Primary Examiner*—M. Rachuba
*Assistant Examiner*—Kenneth J. Hansen

[57] ABSTRACT

A one-piece, multi-functional gripping connector is disclosed, to be used as a shower curtain rod attachment in conjunction with a standard shower curtain and curtain rod assembly, to allow the end or ends of the curtain to be turned inward, thereby preventing water from spraying out of the shower enclosure. The sole point of support for the attachment is its connection to the shower curtain rod. The invention is comprised of a single sheet of strong, flexible, elastic material, such as PETG thermoplastic, which is formed into an open-sided, open-ended, tubular shape having rounded edges, and which is also notched and bent 90-degrees at the mid-point to form an elbow configuration. Installation is by hand, without use of tools, and will not damage existing surfaces. Removal of the shower curtain rod is not required. Alternate embodiments are also disclosed, which provide illustrations of the invention's multi-functional aspects.

5 Claims, 4 Drawing Sheets

SHOWER CURTAIN ROD ATTACHMENT

REFERENCE TO RELATED APPLICATIONS

The present application is a Continuation-In-Part of application Ser. No. 08/183,517, filed Jan. 19, 1994, now abandoned.

FIELD OF THE INVENTION

This invention relates to shower curtain rods and, in particular, to attachments to the shower curtain rod which allow the side edges of the shower curtain to be turned inward, parallel to the front and rear walls of the shower enclosure, to prevent water from spraying past the shower curtain and out of the shower enclosure.

BACKGROUND OF THE INVENTION

A common method of containing the water spray within three-sided tub/shower enclosures is to provide a waterproof curtain, supported by a curtain rod, to enclose the open side. When in use, the curtain is drawn closed against the front and rear walls. Typically the seal provided is not tight and the resulting gap allows some water spray to escape. The escaping water presents a safety hazard and can damage structural elements and finishes.

DESCRIPTION OF RELATED ART

Various patents have been issued which disclose means of turning the shower curtain inward and providing a more effective containment of the water spray.

A patent issued in 1993, to Lang (U.S. Pat. No. 5,216,766) discloses a shower curtain rod attachment which is affixed to the curtain rod by a short tube. A slot is provided along its side to allow installation without having to remove the curtain rod. The attachment is loose fitting, allowing sliding and rotation. A curtain support arm is appended perpendicularly to the slotted tube attachment.

The other end of the support arm is attached to the front or rear wall of the enclosure by a hook, a clip, a suction cup, or other suitable device when the shower is in use. The arm can be unhooked, rotated downward to allow opening of the curtain.

The patent to Lang requires attachment to the front or rear wall which, if permanent, may damage the wall finish. Use of adhesive or of a suction cup is disclosed as a less-permanent method, but these means present difficulties in installation and their effectiveness, over time, in a wet environment, is questionable. The slotted tubular plastic attachment, shown in FIG. 5 of the Lang patent drawings, is designed to slide and rotate, characteristics which prevent it from being the sole point of support. The slot provided to allow attachment without removal of the curtain rod must be narrow enough to avoid disengagement upon rotation. This may make attachment by spreading difficult for some users.

The 1992 patent to Ruggiero (U.S. Pat. No. 5,170,970) and the 1983 patent to File (U.S. Pat. No. 4,385,409) disclose means of turning the ends of the shower curtain inward which involve reinforcement of the top leading edge of the curtain. In the case of the Ruggiero patent, the disclosed embodiments will attach to a standard shower curtain rod, but are comprised of relatively complex and expensive fabrications which involve use of non-standard curtains. The hinged bar shaped device depicted in the patent to File is laterally supported by the curtain itself and would, in practice, likely result in twisting distortions of the curtain.

A 1988 patent to Skrzelowski (U.S. Pat. No. 4,769,862) is representative of various other earlier patents which achieve the inward turning of the shower curtain as an integral feature of a non-standard curtain rod design. These devices do not function as attachments to the standard shower curtain and rod assembly.

OBJECT OF THE INVENTION

Accordingly, it is an object of this invention to provide a shower curtain closure device of inherently simple, inexpensive design, which will enable the curtain to turn inward using standard shower curtain and rod assemblies, which will install quickly, without use of tools, has an obvious mode of operation, and which will not mar or alter surfaces of existing shower enclosure walls.

Another object is to provide a visually pleasing shape, which when installed, will be compatible with and similar in appearance to the standard shower curtain rod.

SUMMARY OF THE INVENTION

The disclosed preferred embodiment of the invention is a one-piece multi-functional gripping connector, fabricated of a single sheet of a strong, flexible, elastic material, such as PETG (a thermoplastic), which is cut and formed, or otherwise molded into an open-sided, open-ended tubular shape, and which is further notched, bent, or otherwise molded, into an elbow configuration to achieve the stated objectives.

The dimensions, cross-sectional profile and edge detailing of the open-sided tubular connector are such that it can be pressed by hand onto a standard, cylindrical curtain rod and also, once thus engaged, achieve sufficient gripping friction to resist slippage and rotation under the load imposed by a standard shower curtain. In addition, the two generally symmetrical arms of the invention may have different cross-sectional dimensions. This feature enables the one-piece device to attach to either end of the typical shower curtain tension rod, which normally consists of two telescoping tubes of different diameters.

Once one arm of the gripping connector device is snapped onto the inside face of the shower curtain rod, the other arm can be adjusted to project inward, and parallel to, but not attached to, the enclosing front and/or rear walls of the shower to form a curtain support arm.

To complete the installation, one or two of the shower curtain support rings can be disengaged from the shower curtain rod, and slipped over the cantilevered curtain support arm of the device, resulting in the desired inward turning of the leading edge of the shower curtain. A slight flaring at the ends of each tubular arm will serve to retain the shower curtain rings during use of the shower. Optionally, a functional and decorative finial may be used. To exit, the bather can easily remove the rings from the inwardly cantilevered arm of the device, and then replace them once outside of the enclosure.

Those skilled in the art will recognize that the invention's geometric principal, gripping means, and ease of installation will make it suitable for other applications and shape variations. For example, the presented preferred embodiment can be used in the case of privacy cubicle curtains to turn the curtain inward adjacent to walls, thereby enhancing privacy. Addition of adhesive means to the inner surface of the tubular arm would enable the snap-on installation to become permanent, and to have greater load-bearing capacity, a useful option in institutional and public accommodation applications.

The number, shape and geometric arrangement of the tubular gripping arms can be varied to accommodate other applications and, by altering the tubular form, to add accessory functions to the basic invention. For example, the curtain support arm may be given a flattened, paddle-like shape, to provide a surface suitable for application of advertising graphics, or an alternate embodiment, having a third arm projecting downward from the bend of the elbow, could have a hook formed at its bottom end to support bathing accessories.

In another variation, said alternate embodiment of the invention can act as a gripping connector to hold and align a shorter telescoping tension rod or similar device, which can serve to extend the curtain further inward, or be used as a hanging rod for drip-dry clothing. It can be seen that, in this gripping-connecting mode, and through the use of varying geometries, multiple-arm configurations, and permanent attachment means, the disclosed invention is in fact multi-functional and may have numerous other applications.

Furthermore, the disclosed invention can be modified to function in a slideable mode by increasing the inner diameter of the gripping arm to allow slippage on the curtain rod. In this case, rotation may be prevented by addition of a second component part, which may be referred to as a guide stop, to the outboard side of the curtain rod. The guide stop strip would be fixed proximate to the longitudinal axis of the curtain rod by double stick adhesive tape, would fit into the gap created by the opposing open sides of the C-shape gripping arm, and would have a length equal to approximately one half of the length of the curtain rod. In this variation, the C-shape of the gripping arm would encircle the curtain rod sufficiently to prevent disengagement.

BRIEF DESCRIPTION OF THE DRAWINGS

The present invention will become more readily understood by consideration of the following detailed description and from the drawings of preferred and alternate embodiments, in which.

Figure 1:
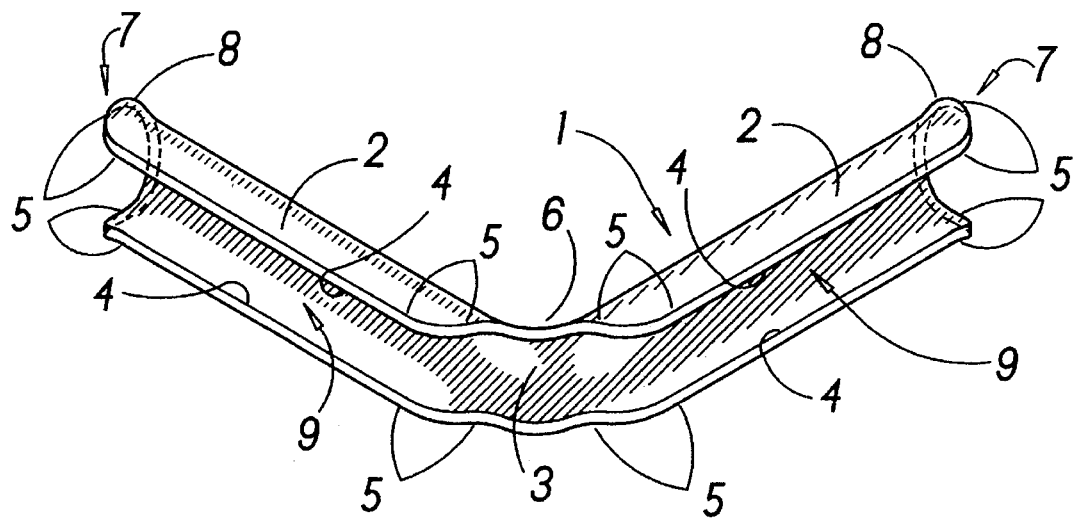
FIG. 1 is a perspective of the disclosed multi-functional gripping connector, showing the various details of the preferred embodiment.

REFERENCE NUMERALS IN THE DRAWINGS 1. one piece gripping connector
2. open sided, open ended, tubular gripping arm(s)
3. flattened segment(s)
4. inner edges of open sides and open ends
5. rounded end portions
6. approximately 90 degree angle
7. open ends of tubular arm(s)
8. flared outer edge
9. open sides of tubular arms
10. curtain
11. curtain rod
12. curtain rings
13. curtain support arm
14. resilient end cap
15. leading edge of curtain
16. rear enclosure wall
17. finial
18. adhesive or friction enhancing means
19. hooked arm
20. telescoping tension rod
21,22,23. tubular gripping arms
24. curved curtain liner rod
25. flattened surface
26. flared end portion
27. guide stop
28. adhesive tape

DETAILED DESCRIPTION OF THE PREFERRED EMBODIMENT

Referring now in detail to the drawings, and initially to FIG. 1, there is shown a preferred form of shower rod attachment in accordance with this disclosure, which is a simple, one-piece gripping connector 1, comprised of two open-sided, open-ended tubular gripping arms 2, which are joined by a flattened segment 3 and separated by an approximately 90 degree angle 6 such that an elbow configuration is formed.

Figure 5:
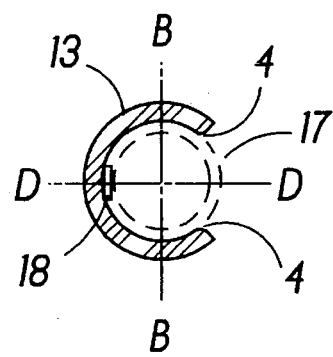
FIG. 5 is a cross-sectional view through the other arm of the invention, showing engagement of an optional end cap (or of a shower curtain rod of smaller diameter).
Figure 6:
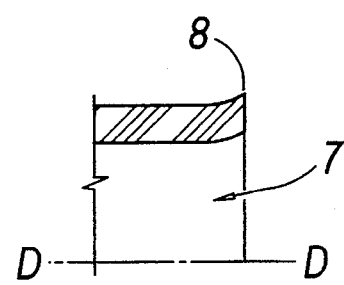
FIG. 6 is a partial longitudinal view through the open end of one of the tubular arms of the invention, showing the flared edge detail.
Figure 7:
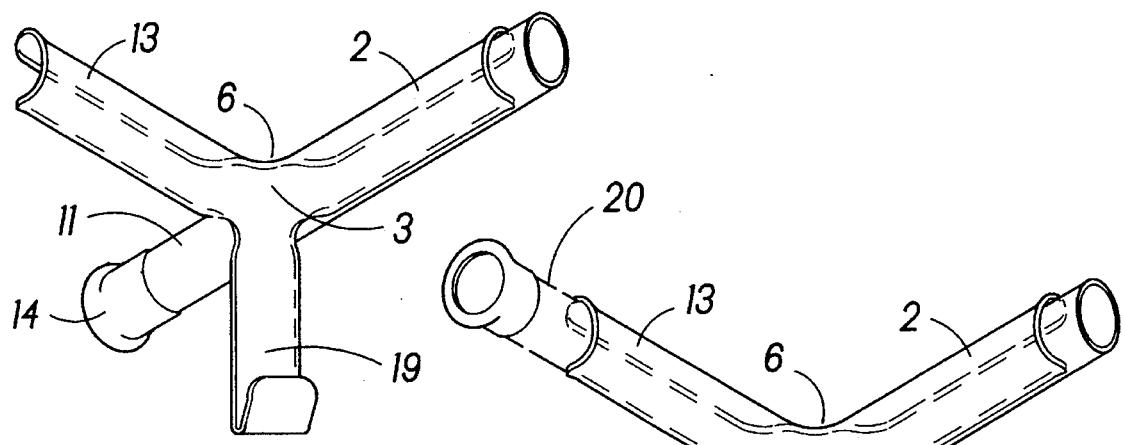
FIG. 7 is a partial perspective view of an alternate embodiment of the invention in which a hook for bathing accessories is provided.

The open ends 7 of each tubular arm are provided with a slightly flared outer edge 8, more clearly shown by FIG. 6. To facilitate installation, inner edges 4 of the open sides 9 and open ends 7 are eased. Open ends 7 are also provided with rounded end portions 5 to effect a wedging action and to enable the device to be pressed by hand on to the curtain rod. See FIG. 4 and FIG. 5 for depiction of the eased inner edges 4, and FIG. 3 for depiction of rounded end portions 5.

Figure 2:
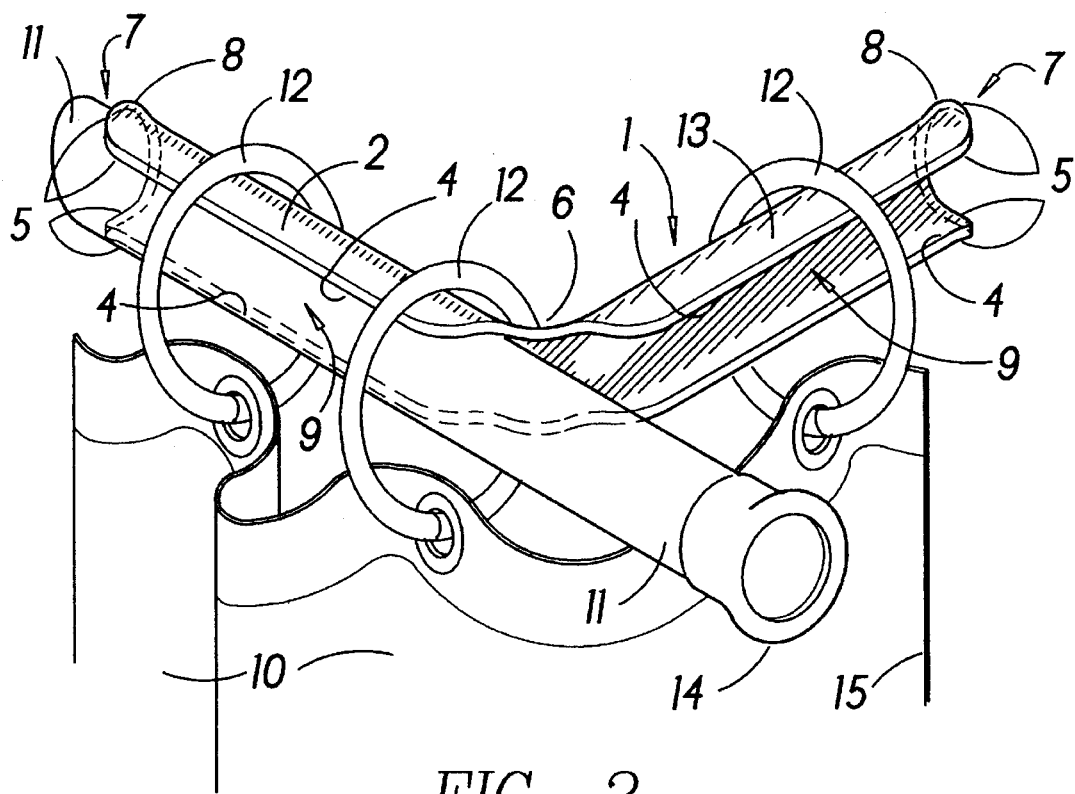
FIG. 2 is a partial perspective view of the disclosed multi-functional gripping connector, being used as a shower curtain rod attachment, and shown mounted on a standard shower curtain rod, supporting a standard shower curtain.

FIG. 2 shows a partial perspective of the one piece gripping connector 1 in combination with a curtain 10, a curtain rod 11, and curtain rod rings 12, and is taken from a point of view above the curtain rod. An enclosing rear wall is assumed to be in the foreground, not shown for clarity. One open sided, open ended, tubular gripping arm 2 is shown pressed onto curtain rod 11. The other gripping arm, also referred to as a curtain support arm 13, is shown cantilevered horizontally inward, at an approximately 90 degree angle 6. Curtain rod 11 has a resilient end cap 14 which rests against the enclosing rear wall, and need not be removed to install the invention. Typically, plastic or wire curtain rings 12 support curtain 10. One or two rings 12 may be disengaged from curtain rod 11 and slipped over the end of the inwardly cantilevered curtain support arm 13. As a result, the leading edge of the curtain 15 will be turned inward, increasing the effectiveness of the closure. By limiting the number of rings so placed, and dimensioning the length of curtain support arm 13 accordingly, the invention may be installed at both ends of the standard shower curtain rod without needing a longer than standard shower curtain.

Figure 3:
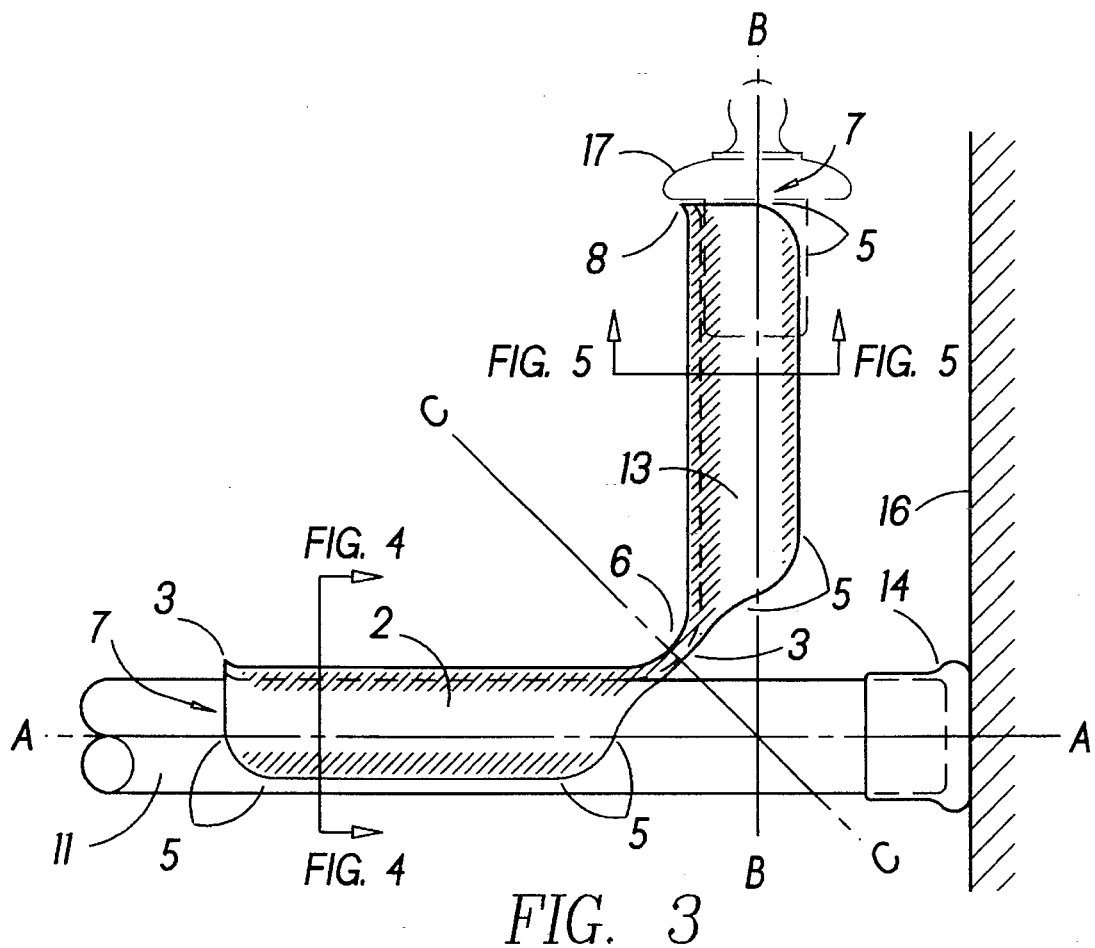
FIG. 3 is a partial plan view, taken from above, showing the disclosed invention in relation to the shower curtain rod and the rear wall of the shower enclosure.

A plan view of the installed invention is shown in FIG. 3. Curtain support arm 13 is positioned parallel to, and a small distance away from, the rear enclosure wall 16 of a shower enclosure (front and opposite side enclosure walls not shown). A separately formed finial 17 may optionally be used as a supplemental means of retaining curtain rings 12 and for decorative effect. In the shown embodiment, one piece gripping connector 1 is generally symmetrical about axis C—C, allowing a similar installation at both ends of curtain rod 11.

Centerline A—A, of curtain rod 11, is shown to intersect centerline B—B of optional finial 17 at an approximately 90 degree angle 6, however, this angle may be adjusted to align with the walls of non-standard shower enclosures.

Figure 4:
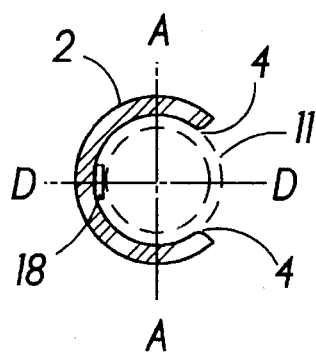
FIG. 4 is a cross-sectional view through one arm of the invention, showing engagement of the shower curtain rod, and an optional adhesive or friction enhancing means.

The cross-sectional view shown in FIG. 4 illustrates how tubular gripping arm 2 engages curtain rod 11 with a tight gripping action that can be further strengthened by the optional addition of adhesive or friction-enhancing means 18. The cross-sectional view shown in FIG. 5 illustrates how curtain support arm 13 similarly engages optional finial 17 (or a shower curtain rod of a smaller diameter). In the preferred installation, both arms of the invention would align on a common horizontal plane, indicated as axis D—D. FIG. 6 shows flared outer edge 8, typical at open ends of the tubular arms 7, which is a supplemental means of retaining curtain rings 12.

Figure 8:
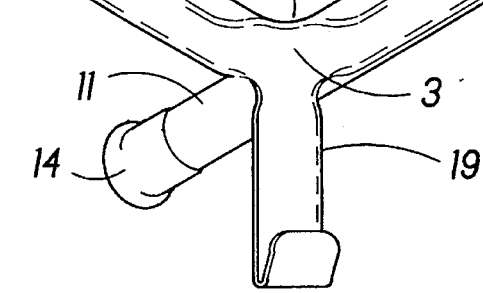
FIG. 8 is a partial perspective view of an alternate embodiment, in which a telescoping tension rod is used to form a hanging rod or shower curtain extension rod.

The views in FIGS. 7 through 11, show alternate embodiments and applications of the invention so as to illustrate its multi-functional aspect. The alternate embodiment shown in FIG. 7, discloses a hooked arm 19, which depends vertically from flattened segment 3. Hooked arm 19 can support shower caps, wash cloths, and similar accessory items. FIG. 8 discloses an alternative application of the same embodiment, in which curtain support arm 13 serves as a gripping connector for partial support of a telescoping tension rod 20, which may act as a further extension of curtain rod 11, or as a hanging rod for drip-dry clothing.

Figure 9:
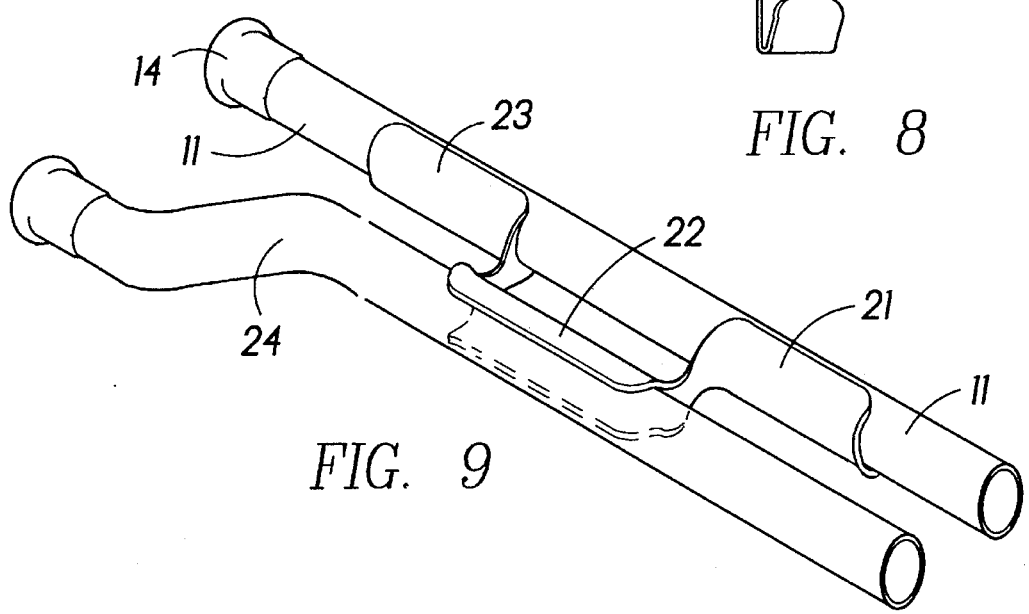
FIG. 9 is a partial perspective view of an additional alternate embodiment of the invention, shown to illustrate the multi-functional aspect of the disclosed gripping connector, which is shown being used to support a curved shower tension rod that is positioned inward of the main curtain rod, for support of a curtain liner, as in a two-curtain installation.

FIG. 9 illustrates the multi-functional potential of the one-piece gripping connector by disclosing a third alternate embodiment, wherein three tubular gripping arms 21, 22, & 23, are arranged in a linear sequence, with gripping arm 22 spaced away from and facing in the opposite direction to the other two arms, said alternate embodiment to be attached to a curtain rod 11 so as to act as a support and alignment device for a second, curved curtain liner rod 24, positioned to support a curtain liner in a two-curtain assembly.

Figure 10:
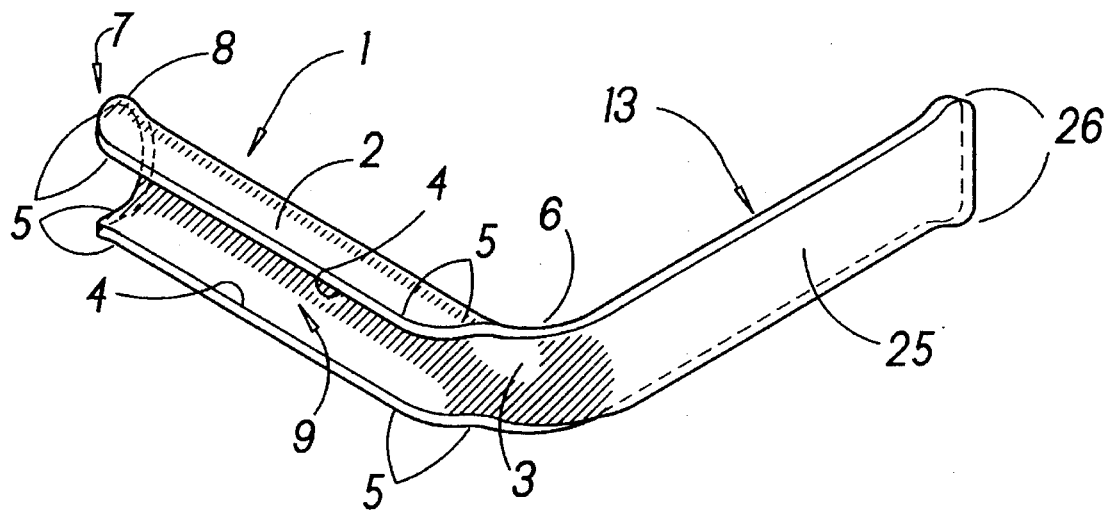
FIG. 10 is a perspective view of an alternate embodiment of the disclosed invention, showing a flattened curtain support arm.

FIG. 10 shows an embodiment of the invention suitable for use as a shower curtain rod attachment, in which the curtain support arm 13 has a flattened surface 25, useful for application of advertising graphics, and a flared end portion 26.

Figure 11:
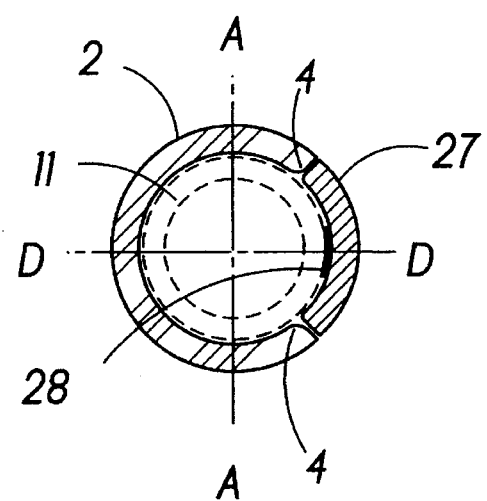
FIG. 11 is a cross-sectional view through a slideable gripping arm, showing a loose engagement of the shower curtain rod, and a guide stop which is adhesively affixed to the curtain rod.

FIG. 11 depicts a slideable embodiment of the invention in which the open sided, open ended tubular gripping arm 2 loosely engages the curtain rod 11 and is both guided along the curtain rod and prevented from rotating by a guide stop 27, which is affixed to the curtain rod 11 by adhesive tape 28.

The foregoing is considered as only illustrative of the principles of the invention, of its use as a shower curtain rod attachment, and of selected alternate embodiments and applications.

Since numerous other suitable embodiments, applications and variations in detail will occur to those skilled in the art, it is not desired to limit the invention to the exact construction and applications shown and described herein. Accordingly, the applicant intends only to be limited by the claims appended hereto.

What is claimed as new is:

1. A one piece gripping connector fabricated of a strong, flexible, elastic material, comprising:

a) two substantially cylindrical gripping arms having C-shaped open sides, each gripping arm having a separate longitudinal axis, and having an inner diameter smaller than that of an outer diameter of a cylindrical object to be gripped;

b) a flattened segment joining each of said gripping arms together having a rotational axis substantially normal to a plane formed by said separate longitudinal axes, whereby said flattened segment provides a means for rotating each of said gripping arms about said rotational axis; and, c) rounded end portions located on an end of each gripping arm adjacent the rotational axis forming an intersection region between each of said gripping arms and said flattened segment, said rounded end portions including annular edges of each of the gripping arms and said flattened segment and extend a predetermined length along each longitudinal axis, wherein a distance between the open sides of each of the C-shaped gripping arms gradually increases along a respective said predetermined length in a direction toward the rotational axis, thereby smoothly blending the intersection region of each of the gripping arms with the flattened segment;

wherein the rounded end portions serve to assist in allowing the sides of each C-shaped gripping arm to be elastically wedged apart in order to engage the cylindrical object to be gripped.

2. In combination with a shower curtain, a curtain rod, and a plurality of curtain rings, a one piece curtain rod attachment fabricated of a strong, flexible, elastic material, which provides a means of turning and horizontally supporting a leading edge of said shower curtain at an approximately 90 degree angle to said curtain rod, said combination comprising:

a) two substantially cylindrical gripping arms having C-shaped open sides, each gripping arm having a separate longitudinal axis, and having an inner diameter smaller than that of an outer diameter of the curtain rod to be gripped;

b) a flattened segment joining each of said gripping arms together at an approximately 90 degree angle, having a rotational axis substantially normal to a plane formed by said separate longitudinal axes, whereby said flattened segment provides a means for rotating each of said gripping arms about said rotational axis; and, c) rounded end portions located on an end of each gripping arm adjacent the rotational axis forming an intersection region between each of said gripping arms and said flattened segment, said rounded end portions including annular edges of each of the gripping arms and said flattened segment and extend a predetermined length along each longitudinal axis, wherein a distance between the open sides of each of the C-shaped gripping arms gradually increases along a respective said predetermined length in a direction toward the rotational axis, thereby smoothly blending the intersection region of each of the gripping arms with the flattened segment;

wherein the rounded end portions serve to assist in allowing the sides of each C-shaped gripping arm to be elastically wedged apart in order to engage the curtain rod to be gripped.

3. In combination with a shower curtain, a curtain rod, and a plurality of curtain rings, a one piece curtain rod attachment fabricated of a strong, flexible, elastic material, which provides a means of turning and horizontally supporting a leading edge of said shower curtain at an approximately 90 degree angle to said curtain rod, said combination comprising:

a. a substantially cylindrical gripping arm having a C-shaped open side, and having an inner diameter smaller than that of an outer diameter of the curtain rod to be gripped;

b. a separate curtain support arm having a longitudinal axis, which is different from a longitudinal axis of the cylindrical gripping arm, thereby providing two separate longitudinal axes;

c. a flattened segment joining said cylindrical gripping arm and said curtain support arm together at an approximately 90 degree angle, having a rotational axis substantially normal to a plane formed by said two separate longitudinal axes, whereby said flattened segment provides a means for rotating the gripping arm and the curtain support arm about said rotational axis; and, d. rounded end portions located on an end of said gripping arm adjacent the rotational axis forming an intersection region between said gripping arm and said flattened segment, said rounded end portions including annular edges of the gripping arm and said flattened segment and extend a predetermined length along said longitudinal axis of the gripping arm, wherein a distance between the open sides of the C-shaped gripping arm gradually increases along a respective said predetermined length in a direction toward the rotational axis, thereby smoothly blending the intersection region of the gripping arm with the flattened segment;

wherein the rounded end portions serve to assist in allowing the sides of the C-shaped gripping arm to be elastically wedged apart in order to engage the curtain rod to be gripped.

4. In combination with a shower curtain, a curtain rod, and a plurality of curtain rings, a two piece curtain rod attachment fabricated of a strong, flexible, elastic material, which provides a slideable means of turning and horizontally supporting a leading edge of said shower curtain at an approximately 90 degree angle to said curtain rod, said combination comprising:

a. two substantially cylindrical gripping arms having C-shaped open sides, each gripping arm having a separate longitudinal axis, with one of said two gripping arms having an inner diameter larger than that of an outer diameter of the curtain rod to be gripped, whereby said one gripping arm may be slidably engaged upon the curtain rod to be gripped;

b. a flattened segment joining each of said gripping arms together at an approximately 90 degree angle, having a rotational axis substantially normal to a plane formed by said separate longitudinal axes, whereby said flattened segment provides a means for joining and rotating each of said gripping arms about said rotational axis, thereby providing one piece of said two piece curtain rod attachment;

c. rounded end portions located on an end of each gripping arm adjacent the rotational axis forming an intersection region between each of said gripping arms and said flattened segment, said rounded end portions including annular edges of each of the gripping arms and said flattened segment and extend a predetermined length along each longitudinal axis, wherein a distance between the open sides of each of the C-shaped gripping arms gradually increases along a respective said predetermined length in a direction toward the rotational axis, thereby smoothly blending the intersection region of each of the gripping arms with the flattened segment, whereby the rounded end portions serve to assist in allowing the sides of each C-shaped gripping arm to be elastically wedged apart in order to engage the curtain rod to be gripped; and, d. a gripping arm guide stop, shaped substantially as an outer segment of a cylindrical sector, having an inner diameter equal to that of said outer diameter of the curtain rod to be gripped, with an inner transverse arc cord dimension slightly smaller than a distance between the open sides of said one gripping arm, and an outer diameter approximately equal to that of said one gripping arm, and also having a length, measured parallel to a longitudinal axis of the guide stop, greater than that of a length, similarly measured, of said one gripping arm, thereby providing a second piece of said two piece curtain rod attachment; and, wherein firstly, said gripping arm guide stop may be attached by adhesive means to the curtain rod to be gripped so that the longitudinal axis of the guide stop is positioned within a horizontal plane passing through a longitudinal axis of the curtain rod to be gripped, and wherein secondly, said one gripping arm may be engaged upon said curtain rod from a side of said curtain rod opposite the guide stop, thereby allowing said one gripping arm to slide along the curtain rod to be gripped, guided and prevented from rotating out of the horizontal plane by said guide stop.

5. In combination with a shower curtain, a curtain rod, and a plurality of curtain rings, a two piece curtain rod attachment fabricated of a strong, flexible, elastic material, which provides a slideable means of turning and horizontally supporting a leading edge of said shower curtain at an approximately 90 degree angle to said curtain rod, said combination comprising:

a. a substantially cylindrical gripping arm having a C-shaped open side, and having an inner diameter larger than that of an outer diameter of the curtain rod to be gripped, whereby said gripping arm may be slidably attached to the curtain rod to be gripped;

b. a separate curtain support arm having a longitudinal axis, which is different from a longitudinal axis of the cylindrical gripping arm, thereby providing two separate longitudinal axes;

c. a flattened segment joining said cylindrical gripping arm and said curtain support arm together at an approximately 90 degree angle, having a rotational axis substantially normal to a plane formed by said two separate longitudinal axes, whereby said flattened segment provides a means for joining and rotating the gripping arm and the curtain support arm about said rotational axis, thereby providing one piece of said two piece curtain rod attachment;

d. rounded end portions located on an end of said gripping arm adjacent the rotational axis forming an intersection region between said gripping arm and said flattened segment, said rounded end portions including annular edges of the gripping arm and said flattened segment and extend a predetermined length along said longitudinal axis of the gripping arm, wherein a distance between the open sides of the C-shaped gripping arm gradually increases along a respective said predetermined length in a direction toward the rotational axis, thereby smoothly blending the intersection region of the gripping arm with the flattened segment; whereby the rounded end portions serve to assist in allowing the sides of the C-shaped gripping arm to be elastically wedged apart in order to engage the curtain rod to be gripped; and, e. a gripping arm guide stop, shaped substantially as an outer segment of a cylindrical sector, having an inner diameter equal to that of said outer diameter of the curtain rod to be gripped, with an inner transverse arc cord dimension slightly smaller than said distance between the open sides of the C-shaped gripping arm, and an outer diameter approximately equal to that of said gripping arm, and also having a length, measured parallel to a longitudinal axis of the guide stop, greater than that of a length, similarly measured, of said gripping arm, thereby providing a second piece of said two piece curtain rod attachment;

wherein firstly, said gripping arm guide stop may be attached by adhesive means to the curtain rod to be gripped having said longitudinal axis of the guide stop positioned within a horizontal plane passing through a longitudinal axis of the curtain rod to be gripped, and secondly, said gripping arm and attached curtain support arm may be engaged upon said curtain rod from a side of said curtain rod opposite the guide stop, thereby allowing said gripping arm to slide along the curtain rod to be gripped, guided and prevented from rotating out of the horizontal plane by said guide stop.

* * * * *